Patented Dec. 25, 1934

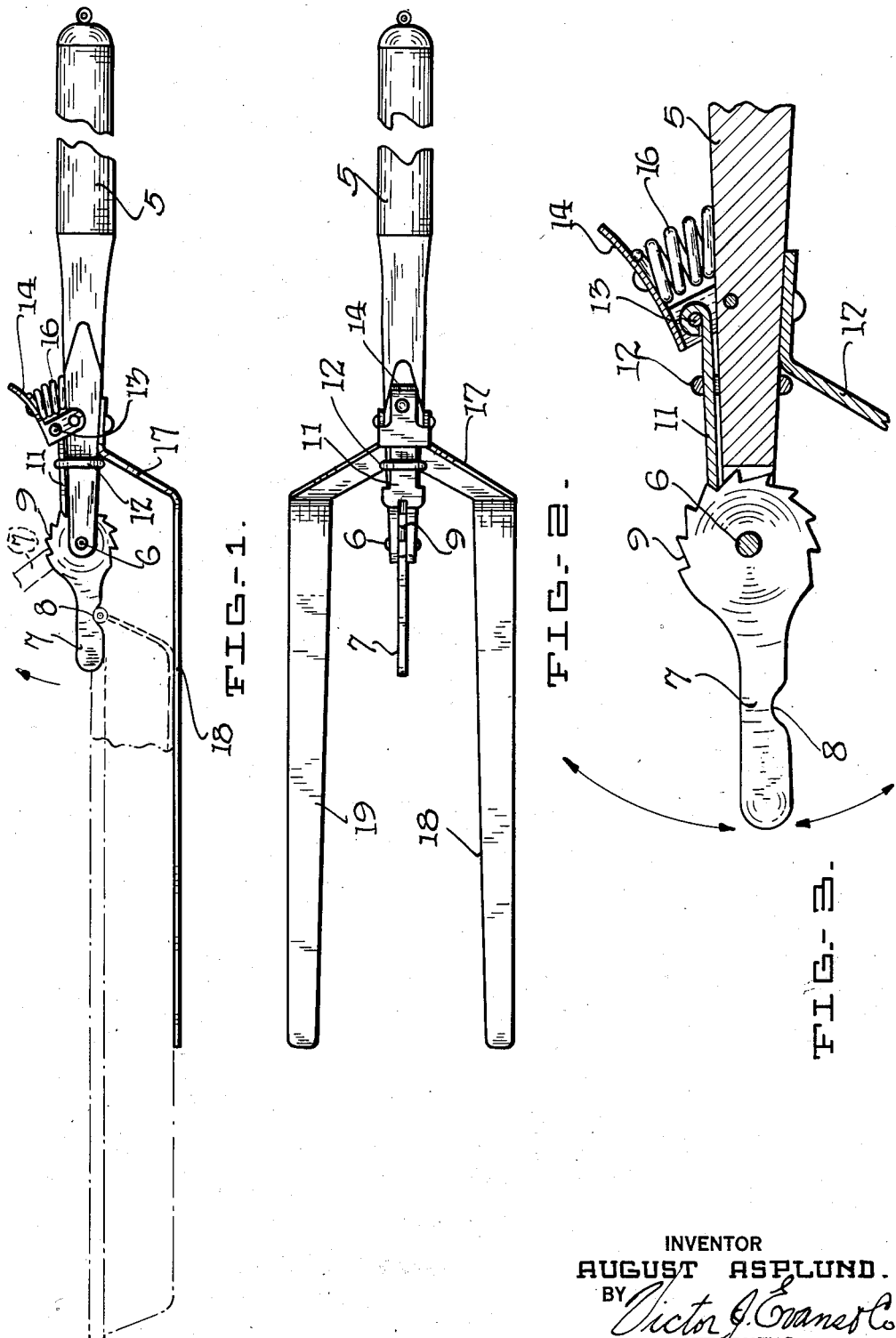

1,985,811

UNITED STATES PATENT OFFICE 1,985,811

PAN LIFTER

August Asplund, San Francisco, Calif.

Application October 28, 1933, Serial No. 695,691

1 Claim. (Cl. 294—29)

This invention relates to improvements in pan lifters, and has particular reference to a device for lifting and transporting pans, dishes and the like.

A further object of the invention is to provide an automatic means for gripping the dish or pan.

A further object is to produce a device which is simple to manipulate and one wherein the hands will not be injured, should the pan or dish be hot.

A further object is to produce a device which is simple in construction, economical to manufacture, and one which may be easily cleaned.

Other objects and advantages will be apparent during the course of the following description.

In the accompanying drawing forming a part of this specification and in which like numerals are employed to designate like parts throughout the same, Fig. 1 is a side elevation of my device as the same would appear in use, a pan being shown in dotted lines, Fig. 2 is a top plan view of Fig. 1, and Fig. 3 is an enlarged fragmentary cross sectional view showing the sliding latch arrangement.

In picking up dishes, particularly hot dishes, which have no handle, it is generally necessary to employ pan holders usually made of fabric material, with the result that the heat rapidly dissipates from the dish or pan through the holder to the hands of the person picking the dish up. Applicant has therefore, devised a simple arrangement which will eliminate this difficulty.

In the accompanying drawing wherein for the purpose of illustration is shown a preferred embodiment of my invention, the numeral 5 designates a handle having pivoted to its front end, as at 6, a finger 7, having a notch 8 formed thereon. Ratchet teeth 9 are formed upon the finger circumferentially of the pivot 6 so as to be engaged by the sliding latch 11. This latch is held in alignment by a guide 12 secured to the handle 5 and has its pivotal connection as at 13 with a pivoted finger piece 14. A spring 16 interposed between the handle 5 and finger piece 14, normally tends to hold the latch 11 in engagement with the teeth 9, as best illustrated in Fig. 3. A forked member 17 is secured to the handle 5 and has bifurcated tines 18 and 19, which are upon a plane below the plane of the handle and parallel thereto.

The result of this construction is that when the tines 18 and 19 are passed beneath a dish as shown in Fig. 1, and assuming that the finger 7 is in substantially a vertical position as indicated in fragmentary dotted lines of Fig. 1, then the operator presses the finger piece 14 against the tension of the spring 16, which draws the latch 11 out of engagement with the teeth 9 and allows the finger 7 to drop through gravity until the notch 8 engages the end of the pan or dish. Therefore, it will be noted that the holding finger will accommodate for various depths of pans. As soon as the finger comes into contact with the pan or dish the finger piece 14 is released and the latch moves forwardly against the face of the ratchet teeth and at a point above the pivot 6. This produces a tangential pressure tending to rotate the finger and press the finger tightly in engagement with the dish being engaged.

It will thus be seen that I have devised an invention that will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a handle, a finger pivoted to said handle, ratchet teeth formed on said finger and concentric with the pivot thereof, a latch engaging said ratchet teeth, spring means to force said latch against said ratchet teeth at a point offset from said pivot and in a direction to cause rotation of said finger, a pair of offset tines secured to said handle and underlying said finger whereby a dish may be supported on said tines and engaged by said finger.

AUGUST ASPLUND.